(12) United States Patent
Kitahara et al.

(10) Patent No.: US 8,188,412 B2
(45) Date of Patent: May 29, 2012

(54) CONFOCAL MICROSCOPE WHICH WEIGHTS AND COMBINES SIGNALS OUTPUT FROM A PLURALITY OF PHOTODETECTORS AND CALCULATES OMNIFOCAL BRIGHTNESS INFORMATION FOR THE PLURALITY OF SIGNALS

(75) Inventors: Akihiro Kitahara, Tokyo (JP); Tsukasa Nittono, Tokyo (JP); Shinsuke Kaneki, Tokyo (JP)

(73) Assignee: Olympus Corporation, Tokyo (JP)

( * ) Notice: Subject to any disclaimer, the term of this patent is extended or adjusted under 35 U.S.C. 154(b) by 731 days.

(21) Appl. No.: 12/343,239

(22) Filed: Dec. 23, 2008

(65) Prior Publication Data

US 2009/0173898 A1 Jul. 9, 2009

(30) Foreign Application Priority Data

Dec. 27, 2007 (JP) ................. 2007-337832
Oct. 2, 2008 (JP) ................. 2008-256998

(51) Int. Cl.
*G02B 7/04* (2006.01)
*G02B 27/40* (2006.01)
*G02B 27/64* (2006.01)

(52) U.S. Cl. .............. 250/201.3; 250/234; 356/319; 356/326

(58) Field of Classification Search ........... 250/201.3, 250/234–236, 201.4; 356/310, 300, 319, 356/320, 326
See application file for complete search history.

(56) References Cited

U.S. PATENT DOCUMENTS

| | | | | |
|---|---|---|---|---|
| 6,545,265 B1* | 4/2003 | Czarnetzki et al. | | 250/234 |
| 2002/0176160 A1* | 11/2002 | Suzuki et al. | | 359/380 |
| 2004/0150880 A1* | 8/2004 | Nakata et al. | | 359/386 |
| 2004/0238731 A1* | 12/2004 | Nishiyama et al. | | 250/234 |
| 2005/0007641 A1* | 1/2005 | Lauer | | 359/233 |

FOREIGN PATENT DOCUMENTS

| | | |
|---|---|---|
| JP | 2002-517774 A | 6/2002 |
| JP | 2005-055540 A | 3/2005 |
| JP | 2007-133419 A | 5/2007 |
| WO | WO 99/63381 A1 | 12/1999 |

* cited by examiner

*Primary Examiner* — Francis M Legasse, Jr.
(74) *Attorney, Agent, or Firm* — Holtz, Holtz, Goodman & Chick, PC

(57) ABSTRACT

A confocal microscope includes an objective lens for converging light which is emitted from a light source to a sample, a scanning mechanism for relatively scanning the sample with the light converged to the sample, and a plurality of confocal diaphragm apertures that are arranged at positions optically conjugate to the light-gathering position of the objective lens and have different diaphragm diameters. The confocal microscope further includes a plurality of photodetectors for detecting the intensities of lights respectively transmitting through the confocal diaphragm apertures, and a weighting/combining arithmetic processing unit for combining signals output from the photodetectors after weighting the signals.

22 Claims, 11 Drawing Sheets

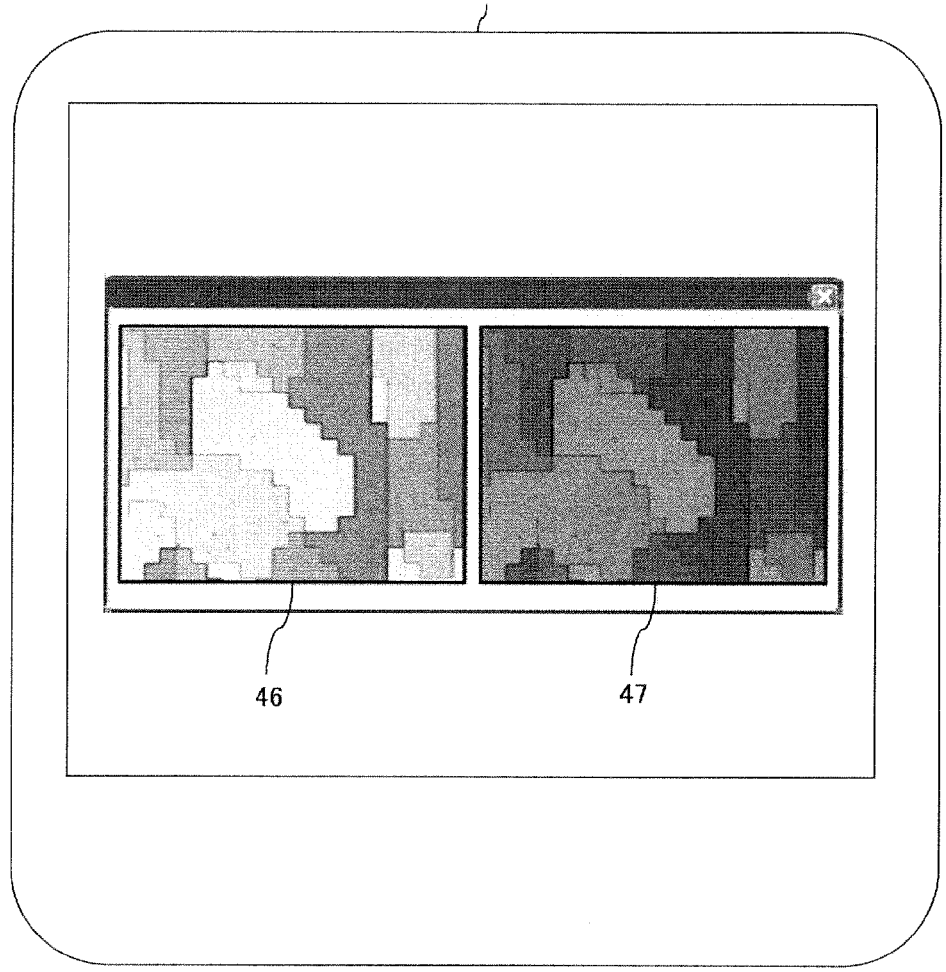
F I G. 6

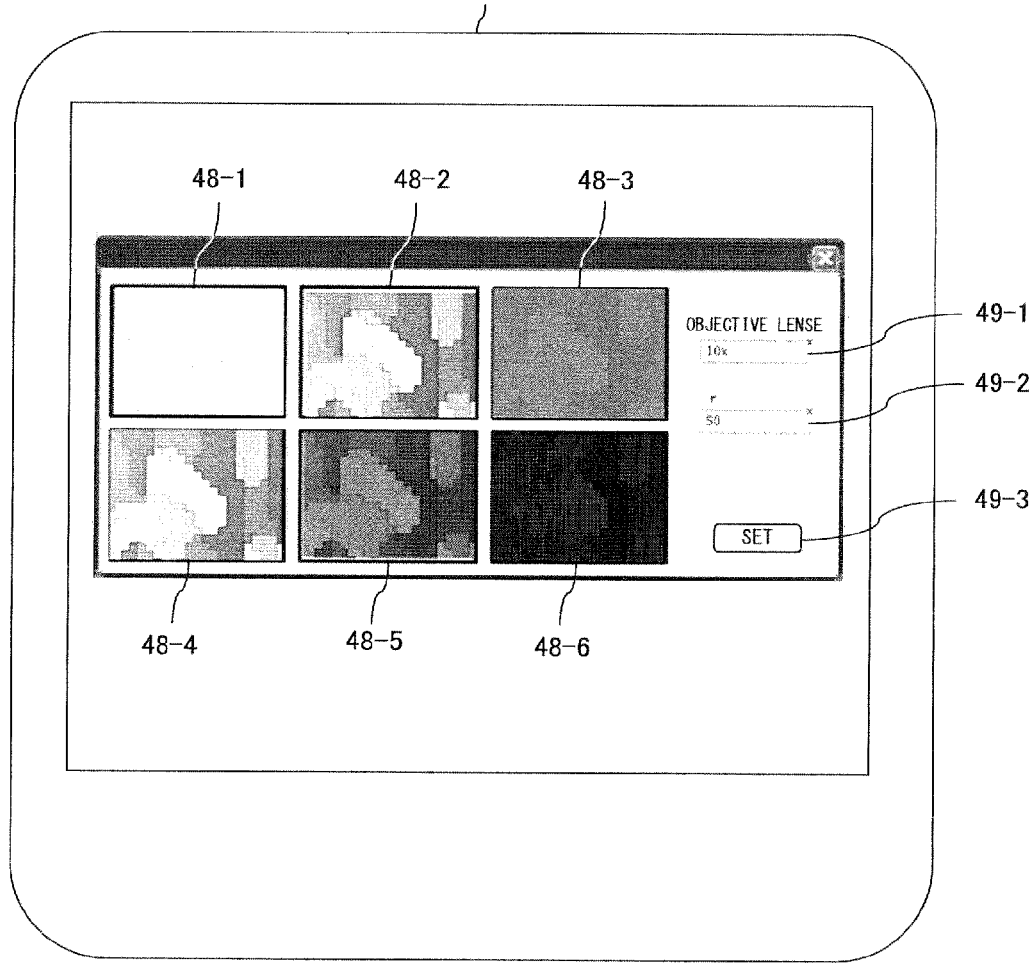
F I G. 8

| OBJECTIVE LENS | SIGNAL |
|---|---|
| HIGH-GRADE OBJECTIVE LENS A | SIGNALS Ia, Ib |
| HIGH-GRADE OBJECTIVE LENS B | SIGNALS Ia, Ib |
| HIGH-GRADE OBJECTIVE LENS C | SIGNALS Ia, Ib |
| UNIVERSAL OBJECTIVE LENS A | SIGNAL Ib |
| UNIVERSAL OBJECTIVE LENS B | SIGNAL Ib |
| UNIVERSAL OBJECTIVE LENS C | SIGNAL Ib |

CONFOCAL MICROSCOPE WHICH WEIGHTS AND COMBINES SIGNALS OUTPUT FROM A PLURALITY OF PHOTODETECTORS AND CALCULATES OMNIFOCAL BRIGHTNESS INFORMATION FOR THE PLURALITY OF SIGNALS

CROSS REFERENCE TO RELATED APPLICATIONS

This application is based upon and claims the benefit of priority from the prior Japanese Patent Application No. 2007-337832, filed Dec. 27, 2007, and the prior Japanese Patent Application No. 2008-256998, filed Oct. 2, 2008, the entire contents of which are incorporated herein by reference.

BACKGROUND OF THE INVENTION

1. Field of the Invention

The present invention relates to a confocal microscope for obtaining information about a sample from a transmitted or reflected light from the sample.

2. Description of the Related Art

Confocal microscopes obtain information about a sample by illuminating the sample in the state of a spot, and by detecting with a photodetector the intensity of light transmitting through a confocal diaphragm aperture after gathering the transmitted or reflected light from the sample on the confocal diaphragm aperture. Moreover, the confocal microscopes can obtain information about a wide range of the sample by scanning the sample with various methods of spot light illumination.

FIG. 1 is a schematic diagram showing a confocal microscope of a laser scanning type as one example of conventional confocal microscopes.

The confocal microscope 50 shown in FIG. 1 is configured by comprising a laser light source 51, a PBS (Polarized Beam Splitter) 52, a two-dimensional optical scanner 53, a plurality of objective lenses 54, a ¼ λ plate 55, an image forming lens 56, a pinhole 57, a photodetector 58, a pinhole turret 59, a revolver 60, an XY stage 61, a Z stage 62, a computer 63, and a monitor 64.

Light emitted from the laser light source 51 is incident to the two-dimensional optical scanner 53 after transmitting through the PBS 52. The two-dimensional optical scanner 53 is composed of first and second optical scanners not shown. The two-dimensional optical scanner 53 two-dimensionally scans a light flux, and guides the light flux to any of the objective lenses 54. The light flux incident to the objective lens 54 is converged to scan the sample 65. At this time, the light that scans the sample 65 is converted from a linearly polarized light into a circularly polarized light when transmitting through the ¼λ plate 55. The light reflected on the surface of the sample 65 again transmits through the objective lens 54, is converted from the circularly polarized light into a linearly polarized light that is orthogonal to the incident light when transmitting through the ¼λ plate 55, reflected by the PBS 52 after being guided to the PBS 52 via the two-dimensional optical scanner 53, and gathered on the pinhole 57 by the image forming lens 56. Since the pinhole 57 is arranged at a position that is optically conjugate to the objective lens 54, only a focused light of the light reflected from the sample 65 transmits through the pinhole 57, and is detected by the photodetector 58. Within the pinhole turret 59, a plurality of pinholes having different diameters are arranged to be selectable. To the revolver 60, the plurality of objective lenses 54 are attached to be selectable. The sample 65 is placed on the XY stage 61, and can be moved by the Z stage 62 in the direction of an optical axis. Operations of the two-dimensional optical scanner 53, the Z stage 62, the photodetector 58, the pinhole turret 59, and the revolver 60 are controlled by the computer 63.

FIG. 2 is a schematic diagram showing a relationship between the relative positions Z of the objective lens 54 and the sample 65 and a signal I output from the photodetector 58. The relationship between the relative position Z of the objective lens and the sample and the signal I output from the photodetector is hereinafter referred to as an I-Z curve.

As shown in FIG. 2, if the sample 65 is placed at a focused position Z0 of the objective lens 54, the signal I output from the photodetector 58 is maximized. As the relative position Z of the objective lens 54 and the sample 65 is getting away from this position, the signal I output from the photodetector 58 rapidly drops.

With this characteristic, converged light is two-dimensionally scanned by the two-dimensional optical scanner 53, and the signal I output from the photodetector 58 is imaged in synchronization with the two-dimensional optical scanner 53, whereby only a particular height of the sample 65 is imaged, and an image (confocal image) acquired by optically slicing the sample 65 can be obtained. The obtained image (confocal image) is then displayed on the monitor 64. Moreover, the height information of the sample 65 can be obtained by acquiring a confocal image at each point of the sample 65, and by detecting the position of the Z stage 62, at which the signal I output from the photodetector 58 is maximized. Additionally, an image focused on all of planes (omnifocal image) can be obtained by superposing and displaying the maximum values of the signal I output from the photodetector 58 at respective points of the sample 65.

Additionally, an appropriate image required by a user can be obtained by selecting a suitable pinhole from the pinhole turret 59 in accordance with the performance of an objective lens 54 selectable with the revolver 60, the characteristic of the sample 65, or the like (For example, see Japanese Patent Publication No. 2007-133419).

Furthermore, there is a confocal microscope that varies the diameter of a pinhole in order to optimize a height measurement (for example, see Japanese Patent Publication No. 2005-55540).

Still further, there is a confocal microscope that obtains a difference between pieces of information obtained from pinholes by using the diameters of the plurality of pinholes, and obtains an image on the basis of the difference (for example, see Japanese Patent Application No. 2002-517774).

Still further, examples of a method for varying a pinhole include a variable pinhole mechanism that varies the size of a pinhole itself, and a method for arranging pinholes of different diameters respectively for a plurality of partitioned optical paths in addition to a turret mechanism.

SUMMARY OF THE INVENTION

A confocal microscope according to the present invention is a confocal microscope comprising an objective lens for converging light, which is emitted from a light source, to a sample, a scanning mechanism for relatively scanning the sample with the light converged to the sample, a plurality of confocal diaphragm apertures that are arranged at positions optically conjugate to the light-gathering position of the objective lens and have different diaphragm diameters, and a plurality of photodetectors for detecting the intensities of lights respectively transmitting through the plurality of confocal diaphragm apertures. In this confocal microscope, a weighting/combining arithmetic processing unit for combining signals respectively output from the plurality of photodetectors after weighting the signals is comprised.

The weighting/combining arithmetic processing unit may be configured to combine the signals respectively output from the plurality of photodetectors after weighting the signals by calculating the weighted mean of the signals.

Additionally, the above described confocal microscope may be configured to further comprise a displaying unit for displaying the result of an arithmetic operation performed by the weighting/combining arithmetic processing unit, and an instruction inputting unit for inputting a weight to the weighting/combining arithmetic processing unit, and for instructing the arithmetic operation and a display of the result of the arithmetic result. In this confocal microscope, the weighting/combining arithmetic processing unit may be configured to calculate a weighted mean on the basis of the weight input by the instruction inputting unit, and to cause the displaying unit to display the result of the arithmetic operation using the weighted mean.

A confocal microscope according to the present invention is a confocal microscope comprising an objective lens for converging light, which is output from a light source, to a sample, a scanning mechanism for relatively scanning the sample with the light converged to the sample, a focus moving unit for relatively moving the light-gathering position of the objective lens and the position of the sample along the direction of the optical axis of the converged light, a plurality of confocal diaphragm apertures that are arranged at positions optically conjugate to the light-gathering position of the objective lens and have different diaphragm diameters, and a plurality of photodetectors for detecting the intensities of lights respectively transmitting through the plurality of confocal diaphragm apertures. In this confocal microscope, a weighting/combining arithmetic processing unit for combining signals respectively output from the plurality of photodetectors after weighting the signals, and a brightness/height information calculating unit for calculating the omnifocal brightness information and the height information of the sample on the basis of a signal resulting from an arithmetic operation of the weighting/combining arithmetic processing unit are comprised.

The above described confocal microscope may be configured to further comprise a signal selecting unit for selecting at least one of the signals output from the plurality of photodetectors in accordance with the type of the objective lens. In this confocal microscope, the weighting/combining arithmetic processing unit may determine a signal with higher reliability among a plurality of signals if the signal selecting unit selects the plurality of signals respectively output from the plurality of photodetectors, and the brightness/height information calculating unit may calculate the omnifocal brightness information and the height information of the sample on the basis of the signal with higher reliability, which is determined by the weighting/combining arithmetic processing unit.

Additionally, the above described confocal microscope may be configured to further comprise a signal selecting unit for selecting at least one of the signals output from the plurality of photodetectors in accordance with the type of the objective lens. In this confocal microscope, if only one signal output from a predetermined photodetector is selected by the signal selecting unit, the sensitivity or the gain of the predetermined photodetector may be changed a plurality of times, and a signal may be output from the predetermined photodetector to the weighting/combining arithmetic processing unit each time the sensitivity or the gain is changed, the weighting/combining arithmetic processing unit may determine a signal with higher reliability among a plurality of signals output from the predetermined photodetector, and the brightness/height information calculating unit may calculate the omnifocal brightness information and the height information of the sample on the basis of the signal with higher reliability, which is determined by the weighting/combining arithmetic processing unit.

The confocal microscope may be configured to further comprise a signal selecting unit for selecting at least one of the signals output from the plurality of photodetectors in accordance with the type of the objective lens. In this confocal microscope, the weighting/combining arithmetic processing unit may combine a plurality of signals after weighting the signals if the signal selecting unit selects the plurality of signals respectively output from the plurality of photodetectors.

Furthermore, a confocal microscope according to the present invention is a confocal microscope comprising an objective lens for converging light, which is emitted from a light source, to a sample, a scanning unit for relatively scanning the sample with the light converged to the sample, a focus moving unit for relatively moving the light-gathering position of the objective lens and the position of the sample along the direction of the optical axis of the converged light, a plurality of confocal diaphragm apertures that are arranged at positions optically conjugate to the light-gathering position of the objective lens and have different diaphragm diameters, and a plurality of photodetectors for detecting the intensities of lights respectively transmitting through the plurality of confocal diaphragm apertures. In this confocal microscope, a weighting/combining arithmetic processing unit for combining signals respectively output from the plurality of photodetectors with a predetermined combining method including weighting, and a brightness/height information calculating unit for calculating the omnifocal brightness information and the height information of the sample on the basis of a signal output from a predetermined photodetector among the plurality of photodetectors are comprised, and the weighting/combining arithmetic processing unit decides a signal output to the brightness/height information calculating unit among the signals respectively output from the plurality of photodetectors on the basis of a predetermined determination reference.

Additionally, the weighting/combining arithmetic processing unit may be configured to decide, for each pixel, a signal output to the brightness/height information calculating unit among the signals respectively output from the plurality of photodetectors.

Furthermore, the predetermined determination reference and the predetermined combining method may differ depending on a case of calculating the height information and a case of calculating the omnifocal brightness information.

Still further, the predetermined determination reference may be set based on a relationship between the signals respectively output from the plurality of photodetectors and a predetermined value, a difference between the signals respectively output from the plurality of photodetectors, or a relationship between an approximate curve obtained with the signals respectively output from the plurality of photodetectors and a reference curve.

A confocal microscope according to the present invention is a confocal microscope comprising a plurality of objective lenses for converging light, which is emitted from a light source, to a sample, a scanning unit for relatively scanning the sample with the light converged to the sample, a focus moving unit for relatively moving the light-gathering position of the objective lens and the position of the sample along the direction of the optical axis of the converged light, a plurality of confocal diaphragm apertures that are arranged at positions optically conjugate to the light-gathering position of the objective lens and have different diaphragm diameters, a plurality of photodetectors for detecting the intensities of lights respectively transmitting through the plurality of confocal diaphragm apertures, and a signal selecting unit for selecting at least one of the signals output from the plurality of photodetectors in accordance with the type of the objective lens.

The above described confocal microscope may be configured to further comprise a weighting/combining arithmetic processing unit for determining a signal with higher reliability among the plurality of signals selected by the signal selecting unit, and a brightness/height information calculating unit for calculating the omnifocal brightness information and the height information of the sample on the basis of the signal with higher reliability, which is determined by the weighting/combining arithmetic processing unit.

Additionally, the above described confocal microscope may be configured so that if only one signal output from a predetermined photodetector is selected by the signal selecting unit, the sensitivity or the gain of the predetermined photodetector is changed a plurality of times, and a signal is output from the predetermined photodetector to the weighting/combining arithmetic processing unit each time the sensitivity or the gain is changed, a weighting/combining arithmetic processing unit for determining a signal with higher reliability among a plurality of signals output from the predetermined photodetector, and a brightness/height information calculating unit for calculating the omnifocal brightness information and the height information of the sample on the basis of the signal with higher reliability, which is determined by the weighting/combining arithmetic processing unit, are comprised.

In the above described confocal microscope, the weighting/combining arithmetic processing unit may be configured to determine a signal, which is not saturated among the plurality of signals output from the predetermined photodetector and the intensity of which is the highest, to be the signal with higher reliability.

Additionally, in the above described confocal microscope, a weighting/combining arithmetic processing unit for combining a plurality of signals selected by the signal selecting unit after weighting the signals, and a brightness/height information calculating unit for calculating the omnifocal brightness information and the height information of the sample on the basis of the signal resulting from an arithmetic operation of the weighting/combining arithmetic processing unit may be comprised.

Furthermore, the plurality of photodetectors may be configured to simultaneously detect the intensities of lights respectively transmitting through the plurality of confocal diaphragm apertures.

Still further, the signals respectively output from the plurality of photodetectors are optically or electrically adjusted so that the intensities of the signals at a focused position of the sample become equal.

Still further, the signals respectively output from the plurality of photodetectors are optically or electrically adjusted so that the intensities of the signals at a focused position of the sample become different at a predetermined ratio.

Still further, the weighting/combining arithmetic processing unit may be configured to execute a normalization process for the signals respectively output from the plurality of photodetectors on the basis of the sensitivity characteristics of the plurality of photodetectors.

Still further, the above described confocal microscope may be configured to further comprise a weight ratio setting unit for setting at least two or more mutually different ratios, and a displaying unit for displaying a plurality of pieces of omnifocal brightness information calculated by the brightness/height information calculating unit on one screen. In this confocal microscope, the weighting/combining arithmetic processing unit may combine the plurality of signals after weighting the signals for each of the two or more ratios set by the weight ratio setting unit, and the brightness/height information calculating unit may calculate the omnifocal brightness information for the plurality of signals resulting from the arithmetic operation of the weighting/combining arithmetic processing unit.

Still further, the above described confocal microscope may be configured to further comprise an arithmetic result selecting unit for causing a user to select one piece of omnifocal brightness information among the plurality of pieces of omnifocal brightness information displayed by the displaying unit, and a weight ratio instructing unit for instructing a ratio used when omnifocal brightness information selected by the arithmetic result selecting unit as a ratio used for the arithmetic operation of the weighting/combining arithmetic processing unit at and after the next time.

BRIEF DESCRIPTION OF THE DRAWINGS

FIG. 6 is a schematic diagram showing examples of images displayed on the monitor;

FIG. 8 is a schematic diagram showing examples of images displayed on the monitor;

FIG. 11 is a schematic diagram showing one example of a table.

DESCRIPTION OF THE PREFERRED EMBODIMENTS

Embodiments according to the present invention are described below with reference to the drawings.

Figure 3:
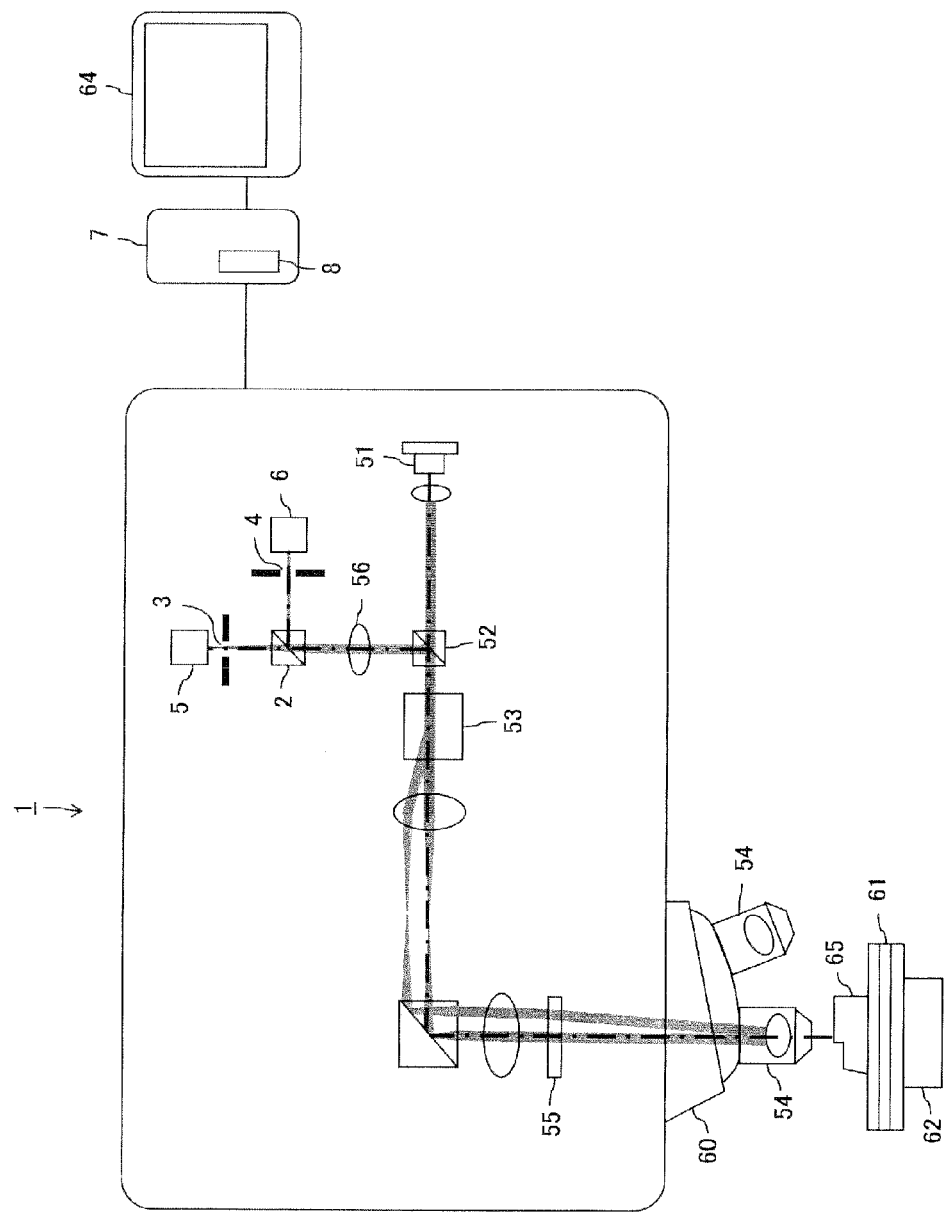
FIG. 3 is a schematic diagram showing a confocal microscope according to an embodiment of the present invention.

FIG. 3 is a schematic diagram showing a confocal microscope according to an embodiment of the present invention. The same constituent elements as those of the confocal microscope 50 shown in FIG. 1 are denoted with the same reference numerals.

The confocal microscope 1 shown in FIG. 3 is configured by including a laser light source 51, a PBS 52, a two-dimensional optical scanner 53, a plurality of objective lenses 54, a ¼λ plate 55, an image forming lens 56, a revolver 60, an XY stage 61, a Z stage 62, a monitor 64, a beam splitter 2, pinholes 3 and 4, photodetectors 5 and 6, and a computer 7. Assume that the diameter of the pinhole 4 is larger than that of the pinhole 3. To the revolver 60, diverse objective lenses such as a high-grade objective lens having superior aberration performance, a reasonable universal objective lens of a low magnification, a long-working distance objective lens, and the like are attachable as the objective lenses 54.

Figure 1:
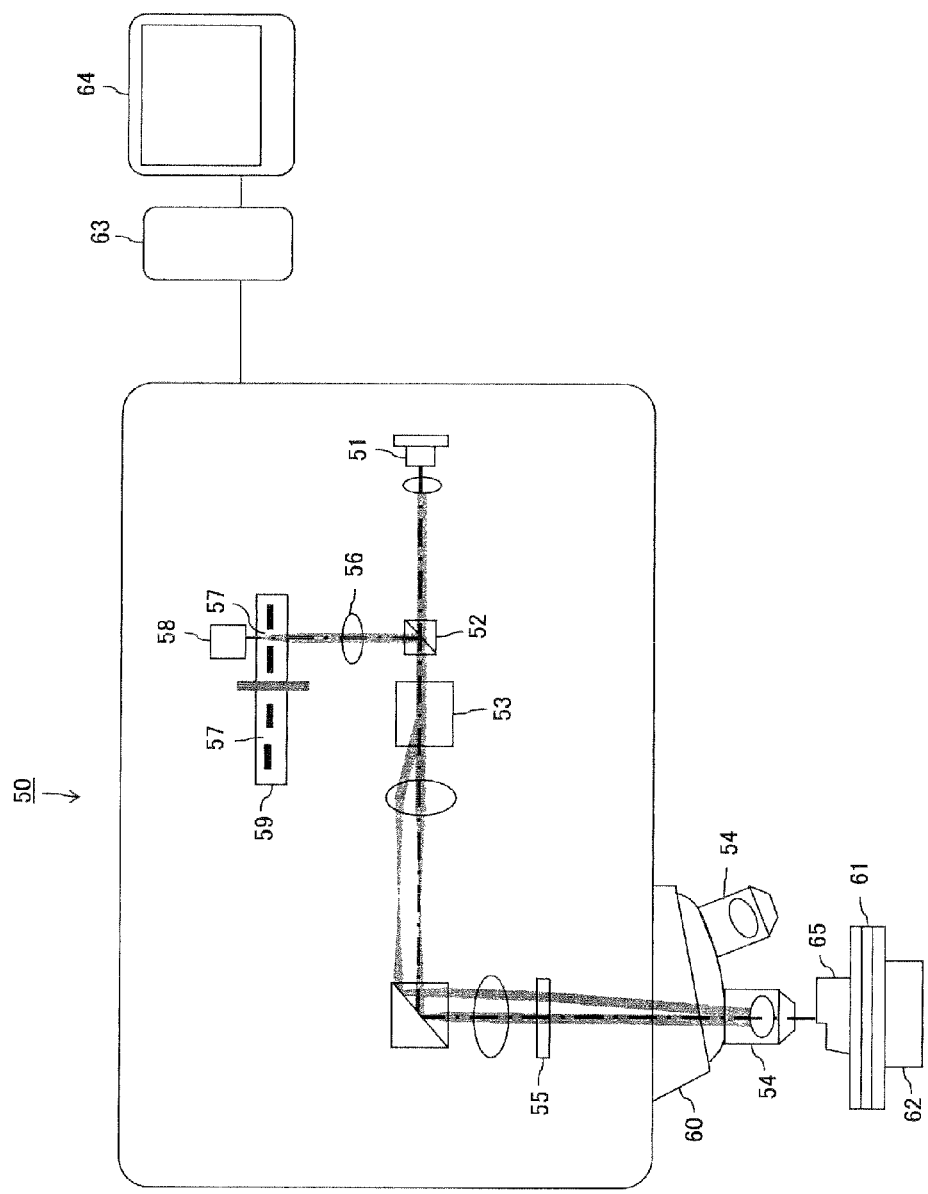
FIG. 1 is a schematic diagram showing a conventional confocal microscope.
Figure 2:
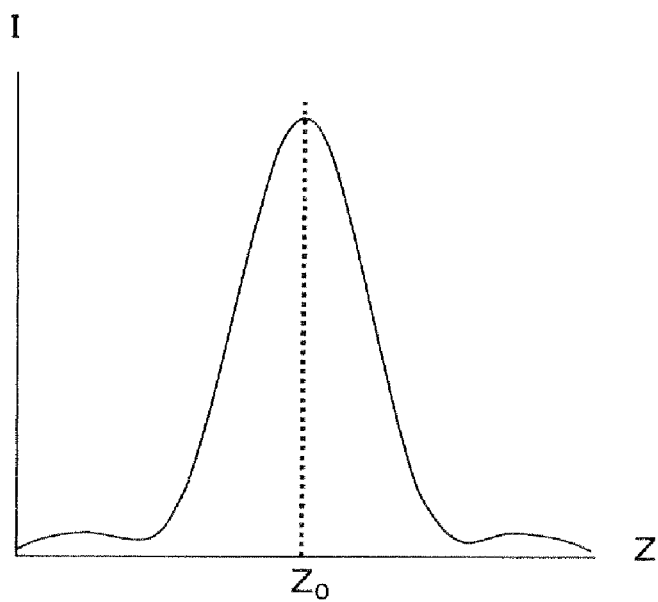
FIG. 2 is a schematic diagram showing a relationship between the relative position Z of an objective lens and a sample, and a signal I output from a photodetector.

The confocal microscope 1 shown in FIG. 3 is different from the conventional confocal microscope 50 shown in FIG. 1 in the points that the beam splitter 2 is arranged after the image forming lens 56 to split a detected light at a predetermined ratio, the pinholes 3 and 4 of different diameters are arranged after the beam splitter 2, and the photodetectors 5 and 6 for respectively detecting lights that transmit through the pinholes 3 and 4 are arranged after the pinholes 3 and 4. The computer 7 has a weighting/combining arithmetic processing unit 8 for combining signals respectively output from the photodetectors 5 and 6 with a predetermined combining method including weighting.

Figure 4A:
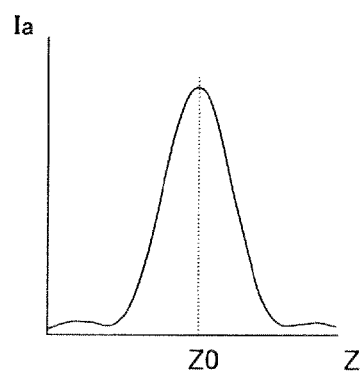
FIG. 4A is a schematic diagram showing a relationship between the relative position Z of an objective lens and a sample and a signal Ia output from a photodetector.
Figure 4B:
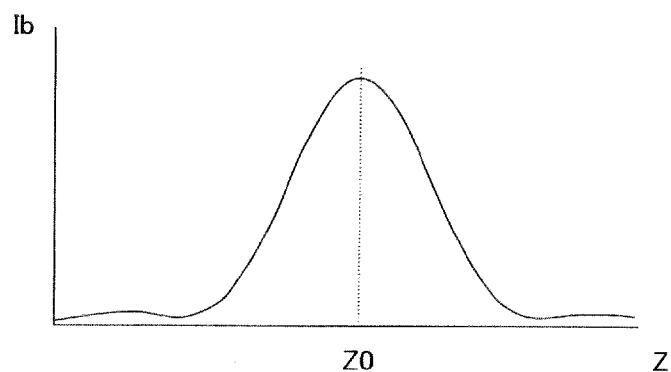
FIG. 4B is a schematic diagram showing a relationship between the relative position Z of an objective lens and a sample and a signal Ib output from a photodetector.

FIG. 4A is a schematic diagram showing a relationship between the relative position Z of the objective lens 54 and the sample 65 and a signal Ia output from the photodetector 5. FIG. 4B is a schematic diagram showing a relationship between the relative position Z of the objective lens 54 and the sample 65 and a signal Ib output from the photodetector 6. Since the apertures of the pinholes 3 and 4 are different, their confocal effects mutually differ, resulting in I-Z curves of different half width as shown in FIGS. 4A and 4B. Assume that the signals Ia and Ib at a focused relative position Z0 are electrically adjusted to become equal in this embodiment. Here, an electrically adjusting method for use in a case where photo-multipliers are used as the photodetectors 5 and 6 is described. If the photo-multipliers are used, a value to be electrically adjusted is a detection sensitivity G. The detection sensitivity G can be adjusted by controlling an applied voltage HV applied to a photo-multiplier, and can be represented by the following equation (1) on the basis of a relationship between the applied voltage HV, a coefficient coe, which represents a relationship between the detection sensitivity G and the applied voltage HV, and a coefficient k determined by the number of dynodes.

$$G = k \times HV^{coe} \quad (1)$$

As the coefficient coe, the value that is made public by a manufacturer as the characteristic of the photo-multiplier may be available. More strictly, the characteristic may be experimentally obtained for each apparatus.

Additionally, the detection sensitivity G and the output I from the photodetector have a relationship of p×G=I if the optics system efficiency of the microscope is assumed to be p. Therefore, the signals Ia and Ib output from the photodetectors 5 and 6 at the focused relative position Z0 can be represented by the following equations (2) and (3).

$$Ia = p(a) \times k(a) \times HV(a)^{coe(a)} \quad (2)$$

$$Ib = p(b) \times k(b) \times HV(b)^{coe(b)} \quad (3)$$

As a result, the following equation (4) can be obtained if the signals Ia and Ib are equal.

$$HV(b) = \{((p(a) \times k(a)/(p(b) \times k(b))) * (HV(a))^{coe(a)}\}^{(1/coe(b))} \quad (4)$$

Accordingly, the applied voltage HV(b) to the photodetector 6 can be obtained by assigning the applied, for example, voltage HV(a) to the other photodetector 5 to the above equation (4). In consequence, the signals Ia and Ib at the focused relative position Z0 can be made equal.

As another method for adjusting the signals Ia and Ib at the focused relative position Z0 to become equal, they may be optically adjusted by using a reference sample beforehand. Alternatively, a normalization process may be executed on the basis of the sensitivity characteristics of the photodetectors 5 and 6 so that the signals Ia and Ib at the focused relative position Z0 become equal. As the normalization process executed at this time, for example, the output Ib of the photodetector 5 is halved with respect to the output Ia of the photodetector 6 if the sensitivity characteristic of the photodetector 5 is twice that of the photodetector 6.

Operations of a weighting/combining arithmetic processing unit 8 are described next.

The weighting/combining arithmetic processing unit 8 calculates the weighted mean of a ratio r as represented by the following equation (5), and outputs a signal Ic resulting from combining the signals Ia and Ib respectively output from the photodetectors 5 and 6 after weighting them, as a combining method including weighting.

$$Ic = r \times Ia + (1-r) \times Ib \quad (5)$$

Note that $0 \leq r \leq 1$.

Figure 4C:
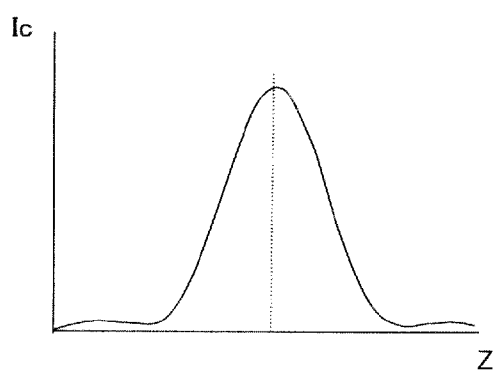
FIG. 4C is a schematic diagram showing a relationship between the relative position Z of an objective lens and a sample and a signal Ic.

FIG. 4C is a schematic diagram showing a relationship between the relative position Z of the objective lens 54 and the sample 65 and the signal Ic output from the weighting/combining arithmetic processing unit 8 in the case where the ratio r is set to an arbitrary value.

In the example shown in FIG. 4C, an I-Z curve in the case where the diameter of the pinhole is approximately a size in the middle of the pinholes 3 and 4 is obtained.

By adjusting the ratio r in this way, an I-Z curve that is intermediate and without stages (confocal effect) can be obtained.

The method for obtaining a confocal image and the height information of the sample 65 by using the signal Ic is the same as that for use in the above described confocal microscope 50. Therefore, its explanation is omitted.

Figure 5:
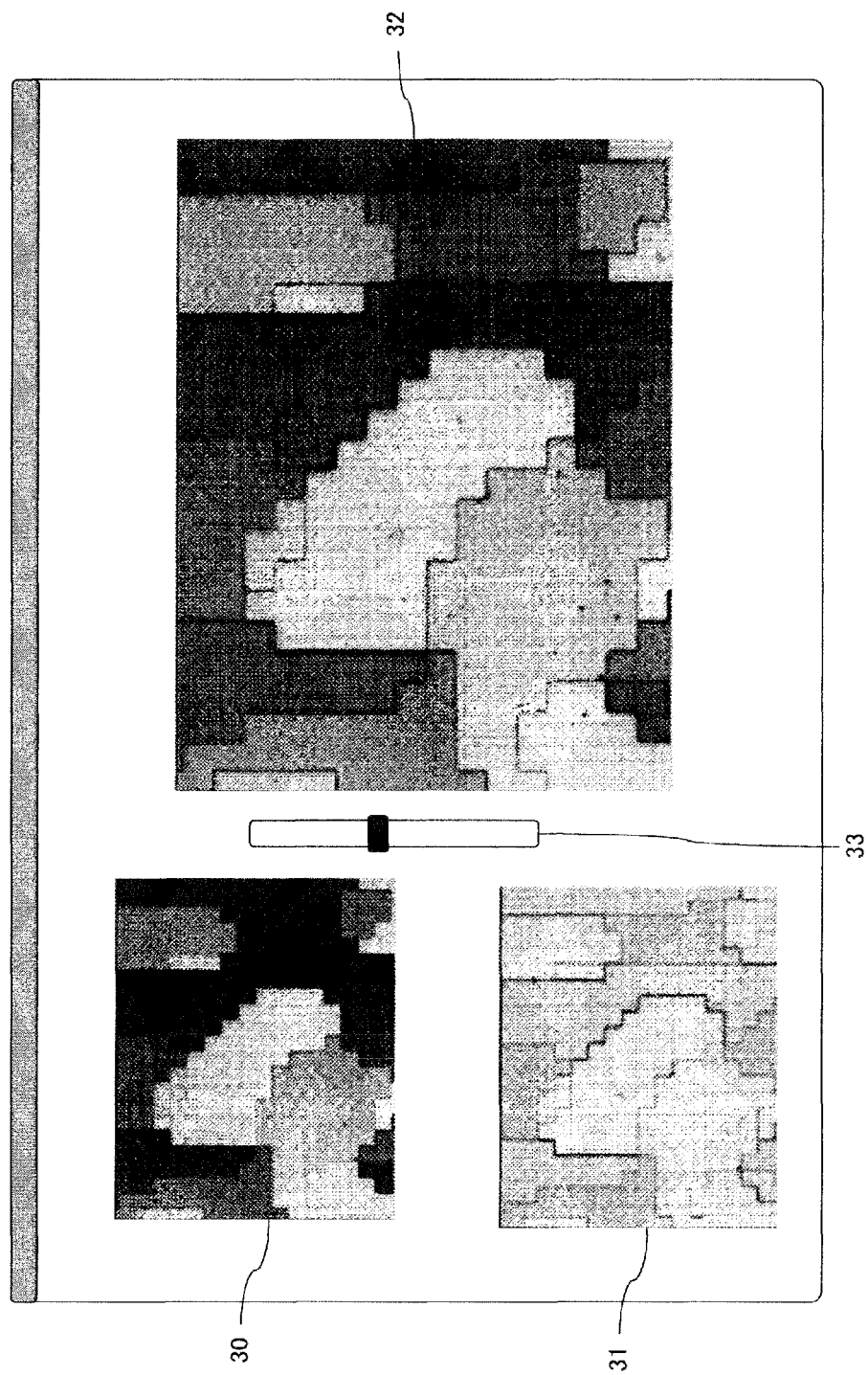
FIG. 5 is a schematic diagram showing one example of a screen displayed on a monitor.

FIG. 5 is a schematic diagram showing examples of confocal images displayed on the monitor 64 of the confocal microscope 1. In FIG. 5, 30 indicates a confocal image obtained with the signal Ia output from the photodetector 5, 31 indicates a confocal image obtained with the signal Ib output from the photodetector 6, and 32 indicates a confocal image obtained with the signal Ic resulting from an arithmetic operation performed by substituting the ratio r that a user sets with a ratio adjustment bar 33 for the above provided equation (5).

It is desirable that the computer 7 simultaneously obtains and processes the signals Ia and Ib respectively output from the photodetectors 5 and 6 in the confocal microscope 1 shown in FIG. 3. However, the signals Ia and Ib may be sequentially obtained and processed. If the computer 7 sequentially obtains the signals Ia and Ib in this way, for example, a switching mirror, etc. may be provided as a replacement for the beam splitter 2.

Additionally, the above described embodiment adopts the weighted mean as the predetermined combining method including weighting. However, a geometric mean or a harmonic mean including weighting may be used as far as a combination ratio can be adjusted.

As described above, the confocal microscope 1 shown in FIG. 3 has the pinholes 3 and 4 having mutually different apertures, and the photodetectors 5 and 6 for respectively detecting lights transmitting through the pinholes 3 and 4, and calculates the weighted mean of the signals Ia and Ib respectively output from the photodetectors 5 and 6. Therefore, a confocal image can be obtained with a confocal effect produced when the diameter of the pinhole is arbitrarily changed within a range between the upper and the lower limit values of the diameter of the aperture of each of the pinholes 3 and 4. Moreover, an arbitrary confocal effect can be produced with the simple configuration, whereby the cost required to manufacture the confocal microscope 1 can be reduced.

A confocal image may be obtained with a signal Ic resulting from an arithmetic operation by preparing an optimum ratio r for each of the objective lenses 54, and by performing the arithmetic operation of the weighting/combining arithmetic processing unit 8 for the signal Ic with the use of the ratio r corresponding to a changed objective lens 54 when the objective lens 54 is changed with the revolver 60. As a result, an optimum confocal image can be obtained for each of the objective lenses 54.

Additionally, a plurality of ratios may be prepared, and the weighting/combining arithmetic processing unit 8 may perform the weighting/combining arithmetic operation for each of the plurality of ratios. For example, two types of ratios r1 and r2 may be prepared, and the weighting/combining arithmetic processing unit 8 may perform the weighting/combining arithmetic operation for the ratios r1 and r2 respectively. Then, a brightness/height information calculating unit 42 may obtain an omnifocal image 46 corresponding to the ratio r1 and the height information of the entire omnifocal image 46, and an omnifocal image 47 corresponding to the ratio r2 and the height information of the entire omnifocal image 47 by using signals Ic1 and Ic2 resulting from the weighting/combining arithmetic operation performed for the ratios r1 and r2 respectively, and the omnifocal images 46 and 47 may be displayed, for example, on the same screen of the monitor 64 (image displaying unit) as shown in FIG. 6.

The weighting/combining arithmetic processing unit 8 may obtain the signals Ic1 and Ic2 by calculating the weighted means represented by the following equations (6) and (7) respectively.

$$Ic1 = r1 \times Ia + (1-r1) \times Ib \quad (6)$$

$$Ic2 = r2 \times Ia + (1-r2) \times Ib \quad (7)$$

Note that $0 \leq r1 \leq 1$, and $0 \leq r2 \leq 1$.

The monitor 64 also serves as a ratio selecting unit. The ratio that corresponds to one of the omnifocal images 46 and 47 and a user selects by touching the screen of the monitor 64 or by operating a mouse or a keyboard after referencing the omnifocal images 46 and 47 displayed on the monitor 64 is transmitted to the weighting/combining arithmetic processing unit 8 as the ratio used for the weighting/combining arithmetic operation to be performed at and after the next time.

Figure 7:
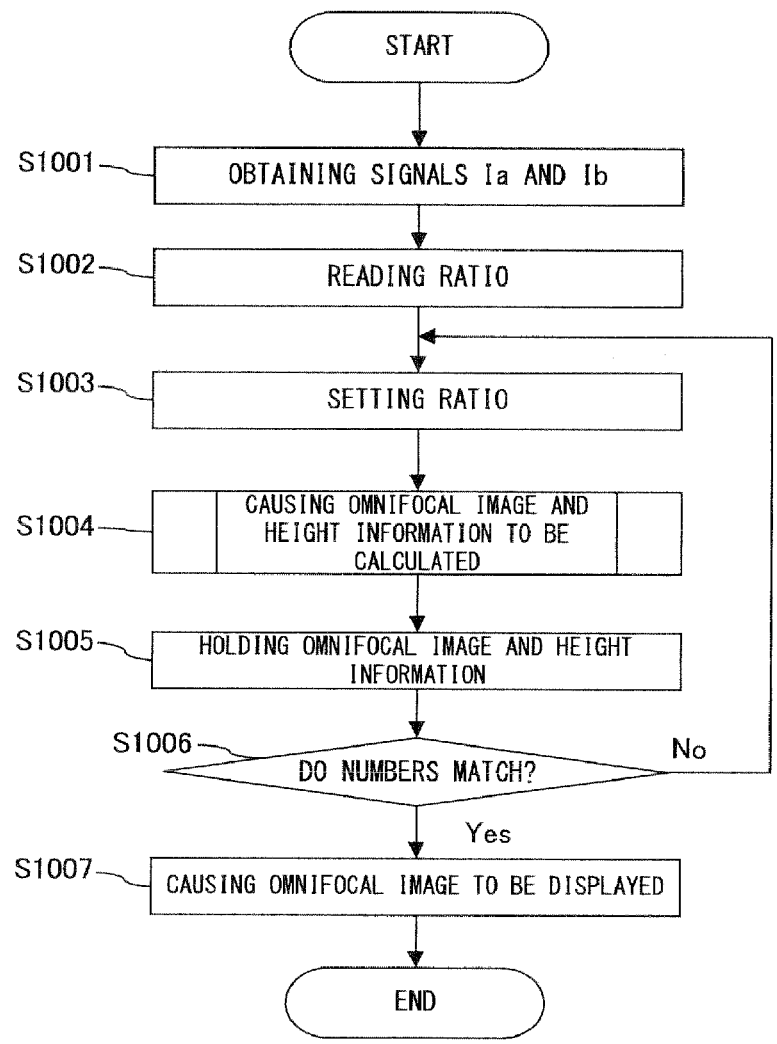
FIG. 7 is a flowchart for explaining operations of a computer.

FIG. 7 is a flowchart for explaining the operations of the computer 7 in the entire flow from an instruction to display an omnifocal image, which is issued by a user, until a display of the omnifocal image in a case where a plurality of ratios may be prepared.

When the instruction to display an omnifocal image is initially issued by a user, the computer 7 obtains the signal Ia output from the photodetector 5, and the signal Ib output from the photodetector 6 (S1001).

Next, the computer 7 reads the first ratio from among a plurality of prestored ratios (S1002). The plurality of ratios may be arbitrarily set by the user.

Then, the computer 7 sets the read ratio as the ratio used by the brightness/height information calculating unit 42 (S1003).

Next, the computer 7 causes the brightness/height information calculating unit 42 to calculate an omnifocal image and the height information of the entire omnifocal image (S1004).

The computer 7 then holds the omnifocal image and the height information, which are calculated in S1004 (S1005).

Next, the computer 7 determines whether or not the number of used ratios and the number of prestored ratios match (S1006).

If the computer 7 determines that the numbers of ratios do not match ("NO" in S1006), the computer 7 reads a ratio yet to be used among the prestored ratios. Then, the process goes back to step S1003.

If the computer 7 determines that the numbers of ratios match ("YES" in S1006), it causes all of omnifocal images held in step S1005 to be displayed on the screen of the monitor 64 (S1007).

The operations of the flowchart shown in FIG. 7 may be performed respectively for all of the objective lenses 54 attached to the revolver 60.

FIG. 8 is a schematic diagram showing examples of omnifocal images displayed on the monitor 64 when the operations represented by the flowchart shown in FIG. 7 are performed for all of the objective lenses 54 attached to the revolver 60.

In the example shown in FIG. 8, an omnifocal image 48-1 obtained with the ratio r1, an omnifocal image 48-2 obtained with the ratio r2, an omnifocal image 48-3 obtained with the ratio r3, an omnifocal image 48-4 obtained with the ratio r4, an omnifocal image 48-5 obtained with the ratio r5, and an omnifocal image 48-6 obtained with the ratio r6 are displayed on the same screen of the monitor 64 for an objective lens 54 of a 10× magnification.

A display box 49-1 shown in FIG. 8 is a field for displaying the magnification of the currently used objective lens 54. A display box 49-2 shown in FIG. 8 is a field for displaying a ratio arbitrarily input by the user. When a set button 49-3 shown in FIG. 8 is pressed by the user, an omnifocal image is obtained based on the ratio displayed in the display box 49-2, and the obtained omnifocal image is displayed on the screen of the monitor 64.

In the confocal microscope 1 thus configured, one of a plurality of omnifocal images displayed on the screen of the monitor 64 is selected by a user, and the ratio used when the selected omnifocal image is obtained, and the type of the objective lens 54 used at that time are held by making an association between them. As a result, each time an objective lens 54 to be used is switched, an omnifocal image can be obtained with an optimum ratio corresponding to the objective lens 54 and displayed on the screen of the monitor 64.

A confocal microscope according to another embodiment of the present invention is described next.

Figure 9:
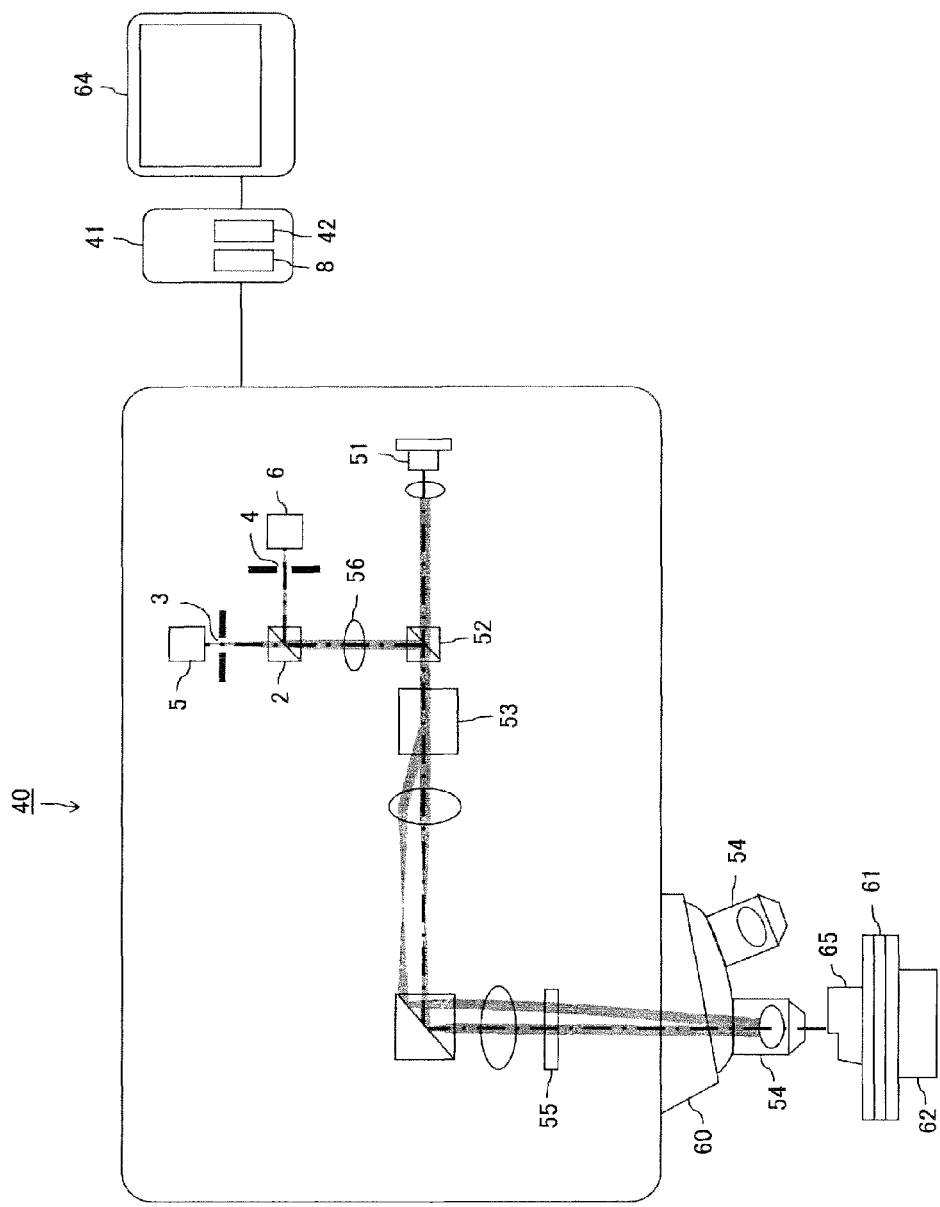
FIG. 9 is a schematic diagram showing a confocal microscope according to another embodiment of the present invention.

FIG. 9 is a schematic diagram showing the confocal microscope according to another embodiment of the present invention. The same constituent elements as those of the confocal microscope 1 shown in FIG. 3 are denoted with the same reference numerals. Assume that the diameter of the pinhole 4 is larger than that of the pinhole 3 similar to the confocal microscope 1 shown in FIG. 3. Also assume that the signals Ia and Ib at the focused relative position Z0 are electrically adjusted to become equal with a method similar to the above described embodiment also in the confocal microscope 40 shown in FIG. 9. The signals Ia and Ib at the focused relative position Z0 may be optically adjusted by using a reference sample beforehand as another method for adjusting the signals Ia and Ib at the focused relative position Z0 to become equal. Alternatively, a normalization process may be executed based on the sensitivity characteristics of the photodetectors 5 and 6 so that the signals Ia and Ib at the focused relative position Z0 become equal.

The confocal microscope 40 shown in FIG. 9 is different from the confocal microscope 1 shown in FIG. 3 in the point that a computer 41 includes the brightness/height information calculating unit 42 in addition to the weighting/combining arithmetic processing unit 8.

The brightness/height information calculating unit 42 obtains height information by recognizing the position where the signals Ia and Ib respectively output from the photodetectors 5 and 6 are maximized, namely, the focused relative position Z0 as the height of the sample 65 for each pixel by scanning a beam with the two-dimensional optical scanner 53 while moving the sample 65 with the Z stage 62 in the Z direction. Moreover, the brightness/height information calculating unit 42 obtains omnifocal brightness information by collecting brightness information at the focused relative position Z0. Then, an omnifocal image is obtained based on the omnifocal brightness information. The height information may be obtained with an approximate curve by widening a moving pitch in the Z direction, and by obtaining the approximate curve with an arithmetic operation based on brightness signals respectively corresponding to a plurality of relative positions Z in the neighborhood of the focus.

In the meantime, the I-Z curves shown in FIGS. 4A and 4B are influenced by the degree of roughness and an inclination of the surface of the sample 65. However, the degree of influence differs depending on the diameter of a pinhole. Namely, a pinhole having a relatively larger diameter is less susceptible to influences such as scattering of light, etc., and less sensitive to the degree of roughness or inclination of the surface of the sample 65. Specifically, the signal Ia at the focused position significantly drops due to the roughness and the inclination of the surface of the sample 65 if the pinhole 3 having a diameter smaller than the pinhole 4 is used. In contrast, the signal Ib does not so drop if the pinhole 4 having a diameter larger than the pinhole 3 is used. Namely, the signal Ib becomes larger than the signal Ia at the focused position. Moreover, the reliability of the signal Ia is relatively low. However, an S/N for a resolution or height information obtained in the case where the pinhole 3 having a diameter smaller than the pinhole 4 is used and the signal Ia, the reliability of which can be maintained, is obtained is superior to that in the case where the pinhole 4 is used.

Accordingly, the weighting/combining arithmetic processing unit 8 of the confocal microscope 40 shown in FIG. 9 makes a comparison between the maximum values of the signals Ia and Ib respectively output from the photodetectors 5 and 6, and obtains a signal I with a larger maximum value. Then, this signal I is determined to be more reliable information. The brightness/height information calculating unit 42 obtains the relative position Z, at which the obtained signal I is acquired, as the height information of the sample 65. Similarly, the brightness/height information calculating unit 42 obtains for each pixel the signal I of the photodetector that outputs the signal I having the larger maximum value, and combines the obtained pieces of brightness information, whereby an image the whole of which is focused (omnifocal image), and the height information of the entire image can be obtained.

With the confocal microscope 40 shown in FIG. 9, more reliable brightness information and height information can be obtained over the entire surface of the sample 65 regardless of the state (such as the degree of roughness, inclination, etc.) of the surface of the sample 65.

The following method is also available as the method for determining the signal I in the weighting/combining arithmetic processing unit 8 of the confocal microscope 40 shown in FIG. 9.

For example, a threshold value (predetermined value) is set for the signal Ia output from the photodetector 5, and the signal Ib output from the photodetector 6 is determined to be more reliable information if the signal Ia becomes the predetermined value or smaller.

Additionally, for example, a threshold value (predetermined value) is set for the value obtained by subtracting the signal Ib from the signal Ia, and the signal Ib is determined to be more reliable information if the difference (value) obtained by subtracting the signal Ib from the signal Ia becomes the predetermined value or smaller.

Furthermore, for example, the amount of separation A between an approximate curve obtained from a plurality of signals Ia in the neighborhood of the focus and a reference curve (expected approximate curve) is obtained, the amount of separation B between an approximate curve obtained from a plurality of signals Ib in the neighborhood of the focus and the reference curve is obtained, and a signal I with a smaller amount of separation is determined to be more reliable information.

These determination methods may be made different depending on the case of obtaining height information and the case of obtaining omnifocal brightness information.

Additionally, the brightness/height information calculating unit 42 may obtain height information on the basis of the height of the Z stage 62 corresponding to the maximum value of the signal Ic after the weighted mean of the signals Ia and Ib is calculated in the weighting/combining arithmetic processing unit 8, and may obtain omnifocal brightness information by collecting the brightness information, which corresponds to the maximum value of the signal Ic after the weighted mean of the signals Ia and Ib is calculated, as brightness information at the focused relative position Z0.

Furthermore, the brightness/height information calculating unit 42 may obtain height information on the basis of the height of the Z stage 62, which corresponds to the maximum value of the signal I determined to be more reliable information with any of the above described determination methods in the weighting/combining arithmetic processing unit 8, and may obtain omnifocal brightness information by collecting as brightness information at the focused relative position Z0 the brightness information corresponding to the maximum value of the signal Ic after the weighted mean of the signals Ia and Ib is calculated.

Still further, the sensitivity of the photodetector 6 that can obtain a signal I more reliable than the photodetector 5 in a relative manner on a rough or inclined surface of the sample 65 may be set to a larger value.

In such a configuration, a difference between the sensitivities of the photodetectors 5 and 6 is assumed to be a value with which the reliability of the signal Ib can be sufficiently obtained on the surface portion of the sample 65, in which the reliability of the signal Ia is low. In this case, the signal Ib can be possibly saturated in a portion other than the surface portion of the sample 65 in which the reliability of the signal Ia is low. Accordingly, the weighting/combining arithmetic processing unit 8 determines the reliability of the signal Ia on the basis of the intensity of the signal, the shape of an approximate curve, the above described determination reference, etc. If the reliability of the signal Ia is high, the height information is obtained by using the signal Ia as far as possible. Alternatively, if the reliability of the signal Ia is low, the height information is obtained by using the signal Ib only on the condition that the signal Ib is not saturated. When omnifocal brightness information is obtained, it is obtained after a normalization process is executed based on the difference between the sensitivities of the photodetectors 5 and 6. For example, if the sensitivity of the photodetector 6 is twice that of the photodetector 5, the signal Ib is halved with respect to the signal Ia.

In this way, brightness information and height information, which are more reliable than those obtained with the confocal microscope 40 shown in FIG. 6, can be obtained over the entire surface of the sample 65 regardless of the state of the surface of the sample 65.

Figure 10:
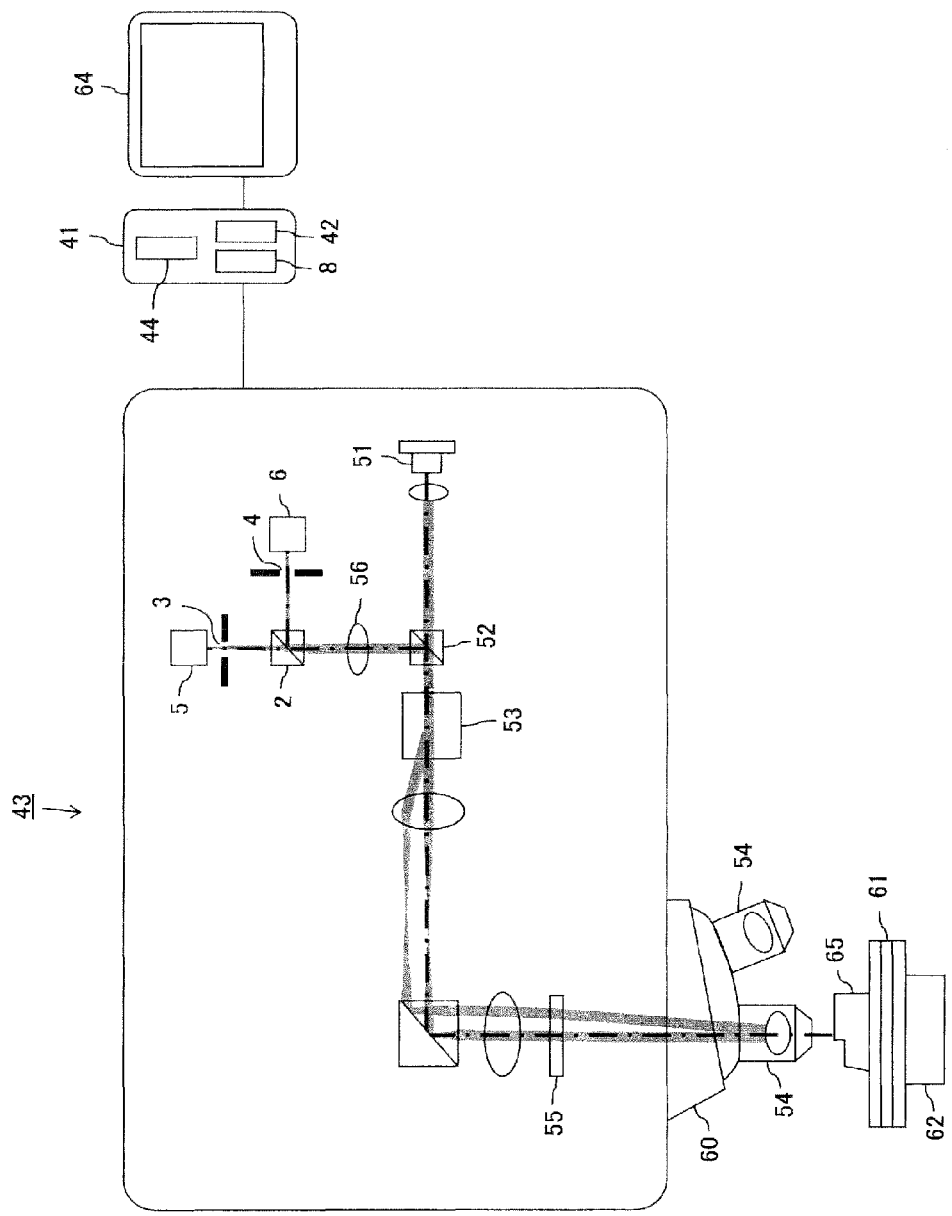
FIG. 10 is a schematic diagram showing a confocal microscope according to a further embodiment of the present invention.

FIG. 10 is a schematic diagram showing a confocal microscope according to a further embodiment of the present invention. The same constituent elements as those of the confocal microscope 40 shown in FIG. 9 are denoted with the same reference numerals, and their explanations are omitted. Here, assume that the diameter of the pinhole 4 is larger than that of the pinhole 3 similar to the confocal microscope 40 shown in FIG. 9. Also assume that the signals Ia and Ib at the focused relative position Z0 are electrically adjusted to become equal with a method similar to the above described embodiments also in the confocal microscope 43 shown in FIG. 10. The signals Ia and Ib at the focused relative position Z0 may be optically adjusted to become equal by using a reference sample beforehand as another method for adjusting the signals Ia and Ib at the focused relative position Z0 to become equal. Alternatively, a normalization process may be executed based on the sensitivity characteristics of the photodetectors 5 and 6 so that the signals Ia and Ib at the focused relative position Z0 become equal.

The confocal microscope 43 shown in FIG. 10 is different from the confocal microscope 40 shown in FIG. 9 in the point of further comprising a signal selecting unit 44 for selecting both of the signals Ia and Ib respectively output from the photodetectors 5 and 6 or selecting the signal Ib in accordance with an objective lens 54 selected by a user.

Figure 4D:
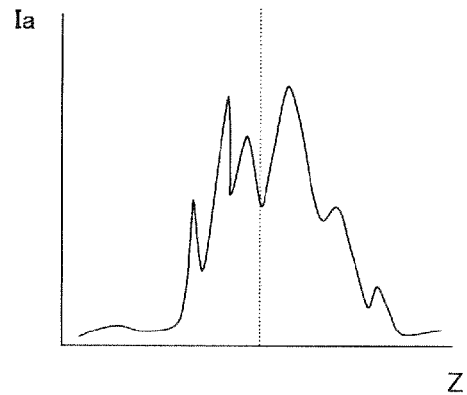
FIG. 4D is a schematic diagram showing a relationship between the position Z of a sample relative to an objective lens and a signal Ia output from a photodetector.

Assume that the diameter of the aperture of the pinhole 3 is set to suit a high-grade objective lens 54 having superior aberration performance in order to improve the confocal effect in the confocal microscope 43 shown in FIG. 10. Accordingly, if a universal objective lens 54 having aberration performance inferior to the high-grade objective lens 54 is used for the pinhole 3, an I-Z curve takes an irregular shape, for example, as shown in FIG. 4D due to the influence of aberration.

Also assume that the diameter of the aperture of the pinhole 4 is set so that an I-Z curve having a regular shape can be obtained if a universal objective lens 54 is used, and the characteristics of I-Z curves sufficiently differ as shown in FIGS. 4A and 4B if a plurality of high-grade objective lenses 54 are combined and used in the confocal microscope 43 show in FIG. 10.

For example, the signal selecting unit 44 has a table 45 shown in FIG. 11. The signal selecting unit 44 selects the signals Ia and Ib on the basis of information stored in the table 45 if a user selects any of the high-grade objective lenses A to C, or selects the signal Ib if the user selects any of universal objective lenses A to C.

Similar to the confocal microscope 40 shown in FIG. 9, the weighting/combining arithmetic processing unit 8 of the confocal microscope 43 shown in FIG. 10 makes a comparison between the maximum values of the signals Ia and Ib if the signal selecting unit 44 selects the signals Ia and Ib, and determines a signal I with a larger maximum value to be more reliable information, similar to the confocal microscope 40 shown in FIG. 9.

The brightness/height information calculating unit 42 of the confocal microscope 43 shown in FIG. 10 determines the relative position Z obtained based on the signal I determined to be more reliable information by the weighting/combining arithmetic processing unit 8 or the signal Ib selected by the signal selecting unit 44 to be the height information of the sample 65, obtains the signal I determined to be more reliable information by the weighting/combining arithmetic processing unit 8 or the signal Ib selected by the signal selecting unit 44 as brightness information for each pixel, and also obtains an omnifocal image by combining the obtained pieces of brightness information.

In this way, an optimum pinhole can be used in accordance with the type of an objective lens 54, whereby an omnifocal image and height information can be obtained with high accuracy even if the objective lens 54 is switched.

Additionally, in the confocal microscope 43 shown in FIG. 10, if the signal Ib is selected by the signal selecting unit 44, the sensitivity or the gain of the photodetector 6 may be changed a plurality of times, and the signal Ib may be output from the photodetector 6 to the weighting/combining arithmetic processing unit 8 each time the sensitivity or the gain of the photodetector 6 is changed. In such a configuration, the weighting/combining arithmetic processing unit 8 may determine the signal Ib with higher reliability among a plurality of input signals Ib. Assuming that the signal Ib of the photodetector 6 when the sensitivity is low is a signal Ib(low), and the signal Ib of the photodetector 6 when the sensitivity is high is a signal Ib(high), the weighting/combining arithmetic processing unit 8 determines that the signal Ib is not saturated and the signal Ib(high) with the highest signal intensity is a highly reliable signal, or determines that the signal Ib(low) is a highly reliable signal if the signal Ib(high) is saturated.

In this way, a highly reliable omnifocal image and height information can be obtained over the entire surface of the sample 65 regardless of the state of the surface of the sample 65 if a user selects a high-grade objective lens 54. If the user selects a universal objective lens 54, a highly reliable omnifocal image and height information can be obtained over the entire surface of the sample 65 regardless of the state of the surface of the sample 65 although the effect produced in the case where the user selects the universal objective lens 54 is inferior to that produced in the case where the user selects the high-grade objective lens 54.

The following method is also available as a method for determining the signal I in the weighting/combining arithmetic processing unit 8 of the confocal microscope 43 shown in FIG. 10 similar to the confocal microscope 40 shown in FIG. 9.

For example, a threshold value (predetermined value) is set for the signal Ia output from the photodetector 5, and the signal Ib output from the photodetector 6 is determined to be more reliable information if the signal Ia becomes the predetermined value or smaller.

Additionally, for example, a threshold value (predetermined value) is set for the value obtained by subtracting the signal Ib from the signal Ia, and the signal Ib is determined to be more reliable information if the difference (value)

obtained by subtracting the signal Ib from the signal Ia becomes the predetermined value or smaller.

Furthermore, for example, the amount of separation A between an approximate curve obtained from a plurality of signals Ia in the neighborhood of the focus and a reference curve (expected approximate curve), the amount of separation B between an approximate curve obtained from a plurality of signals Ib in the neighborhood of the focus and the above described reference curve is obtained, and a signal I with a smaller amount of separation is determined to be more reliable information.

These determination methods may be made different depending on the case of obtaining height information and the case of obtaining omnifocal brightness information.

Additionally, the brightness/height information calculating unit 42 may obtain height information on the basis of the height of the Z stage 62, which corresponds to the maximum value of the signal Ic after the weighted mean of the signals Ia and Ib is calculated in the weighting/combining arithmetic processing unit 8, and may also obtain omnifocal brightness information by collecting the brightness information, which corresponds to the maximum value of the signal Ic after the weighted mean of the signals Ia and Ib is calculated, as brightness information at the focused relative position Z0.

Furthermore, the brightness/height information calculating unit 42 may obtain height information on the basis of the height of the Z stage 62, which corresponds to the maximum value of the signal I determined to be highly reliable information with any of the above described determination methods in the weighting/combining arithmetic processing unit 8, and may also obtain omnifocal brightness information by collecting the brightness information, which corresponds to the maximum value of the signal Ic after the weighted mean of the signals Ia and Ib is calculated, as brightness information at the focused relative position Z0.

Still further, the sensitivity of the photodetector 6 that can obtain a signal I more reliable than the photodetector 5 in a relative manner on a rough or inclined surface of the sample 65 may be set to a larger value.

In such a configuration, a difference between the sensitivities of the photodetectors 5 and 6 is assumed to be a value with which the reliability of the signal Ib can be sufficiently obtained on the surface portion of the sample 65, in which the reliability of the signal Ia is low. In this case, the signal Ib can be possibly saturated in a portion other than the surface portion of the sample 65, in which the reliability of the signal Ia is low. Accordingly, the weighting/combining arithmetic processing unit 8 determines the reliability of the signal Ia on the basis of the intensity of the signal, the shape of an approximate curve, the above described determination reference, etc., obtains height information by using the signal Ia as far as possible if the reliability of the signal Ia is high, or obtains height information by using the signal Ib only on the condition that the signal Ib is not saturated if the reliability of the signal Ia is low. Moreover, omnifocal brightness information is obtained after a normalization process is executed based on the difference between the sensitivities of the photodetectors 5 and 6. For example, if the sensitivity of the photodetector 6 is twice that of the photodetector 5, the signal Ib is halved with respect to the signal Ia.

In the confocal microscope 43 shown in FIG. 10, the weighting/combining arithmetic processing unit 8 may output the signal Ic by combining the signals Ia and Ib with a predetermined combining method including weighting if the signal selecting unit 44 selects the signals Ia and Ib. The signal Ic is output by combining the signals Ia and Ib after weighting them, for example, by calculating the weighted mean of the ratio r like the weighting/combining arithmetic processing unit 8 of the confocal microscope 1 shown in FIG. 3.

In such a configuration, the brightness/height information calculating unit 42 obtains an omnifocal image by acquiring the signal Ic output from the weighting/combining arithmetic processing unit 8 or the signal Ib selected by the signal selecting unit 44 as brightness information for each pixel, and by combining the obtained pieces of brightness information, and also obtains the relative position Z corresponding to the signal Ic output from the weighting/combining arithmetic processing unit 8 or the signal Ib selected by the signal selecting unit 44 as the height information of the sample 65.

What is claimed is:

1. A confocal microscope, comprising:
   an objective lens for converging light, which is output from a light source, to a sample;
   a scanning mechanism for relatively scanning the sample with the light converged to the sample;
   a focus moving unit for relatively moving a light-gathering position of the objective lens and a position of the sample along a direction of an optical axis of the converged light;
   a plurality of confocal diaphragm apertures that are arranged at positions optically conjugate to the light-gathering position of the objective lens and have different diaphragm diameters;
   a plurality of photodetectors for detecting intensities of lights respectively transmitting through the plurality of confocal diaphragm apertures;
   a weighting/combining arithmetic processing unit for combining signals respectively output from the plurality of photodetectors after weighting the signals;
   a brightness/height information calculating unit for calculating omnifocal brightness information and height information of the sample based on a signal resulting from an arithmetic operation of the weighting/combining arithmetic processing unit;
   a weight ratio setting unit for setting at least two mutually different ratios; and
   a displaying unit for displaying a plurality of pieces of omnifocal brightness information calculated by the brightness/height information calculating unit on one screen;
   wherein the weighting/combining arithmetic processing unit combines the plurality of signals after weighting the signals for each of the two or more ratios set by the weight ratio setting unit; and
   wherein the brightness/height information calculating unit calculates the omnifocal brightness information respectively for the plurality of signals resulting from an arithmetic operation of the weighting/combining arithmetic processing unit.

2. The confocal microscope according to claim 1, further comprising a signal selecting unit for selecting at least one of the signals respectively output from the plurality of photodetectors in accordance with a type of the objective lens,
   wherein:
   if the signal selecting unit selects a plurality of signals respectively output from the plurality of photodetectors, the weighting/combining arithmetic processing unit determines, as a signal with high reliability, a signal which is not saturated and an intensity of which is highest among a plurality of signals output from a predetermined photodetector from among the plurality of selected signals; and
   the brightness/height information calculating unit calculates omnifocal brightness information and height information of the sample based on the signal with higher reliability, which is determined by the weighting/combining arithmetic processing unit.

3. The confocal microscope according to claim 1, further comprising a signal selecting unit for selecting at least one of the signals respectively output from the plurality of photodetectors in accordance with a type of the objective lens, wherein:
if only one signal output from a predetermined photodetector is selected by the signal selecting unit, a sensitivity or a gain of the predetermined photodetector is changed a plurality of times, and a signal is output from the predetermined photodetector to the weighting/combining arithmetic processing unit each time the sensitivity or the gain is changed;
the weighting/combining arithmetic processing unit determines a signal with higher reliability among a plurality of signals output from the predetermined photodetector; and
the brightness/height information calculating unit calculates omnifocal brightness information and height information of the sample based on the signal with higher reliability, which is determined by the weighting/combining arithmetic processing unit.

4. The confocal microscope according to claim 1, further comprising a signal selecting unit for selecting at least one of the signals respectively output from the plurality of photodetectors in accordance with a type of the objective lens,
wherein the weighting/combining arithmetic processing unit combines a plurality of signals after weighting the signals if the signal selecting unit selects the plurality of signals respectively output from the plurality of photodetectors.

5. The confocal microscope according to claim 3, wherein the weighting/combining arithmetic processing unit determines a signal, which is not saturated and an intensity of which is highest, to be the signal with higher reliability among the plurality of signals output from the predetermined photodetector.

6. A confocal microscope, comprising:
an objective lens for converging light, which is emitted from a light source, to a sample;
a scanning unit for relatively scanning the sample with the light converged to the sample;
a focus moving unit for relatively moving a light-gathering position of the objective lens and a position of the sample along a direction of an optical axis of the converged light;
a plurality of confocal diaphragm apertures that are arranged at positions optically conjugate to the light-gathering position of the objective lens and have different diaphragm diameters;
a plurality of photodetectors for detecting intensities of lights respectively transmitting through the plurality of confocal diaphragm apertures;
a weighting/combining arithmetic processing unit for combining signals respectively output from the plurality of photodetectors with a combining method including weighting;
a brightness/height information calculating unit for calculating omnifocal brightness information and height information of the sample based on a signal output from a predetermined photodetector among the plurality of photodetectors;
a weight ratio setting unit for setting at least two mutually different ratios; and a displaying unit for displaying a plurality of pieces of omnifocal brightness information calculated by the brightness/height information calculating unit on one screen;
wherein the weighting/combining arithmetic processing unit decides a signal output to the brightness/height information calculating unit among the signals respectively output from the plurality of photodetectors based on a predetermined determination reference,
wherein the weighting/combining arithmetic processing unit combines the plurality of signals after weighting the signals for each of the at least two ratios set by the weight ratio setting unit, and
wherein the brightness/height information calculating unit calculates the omnifocal brightness information respectively for the plurality of signals resulting from an arithmetic operation of the weighting/combining arithmetic processing unit.

7. The confocal microscope according to claim 6, wherein the weighting/combining arithmetic processing unit decides, for each pixel, a signal output to the brightness/height information calculating unit among the signals respectively output from the plurality of photodetectors.

8. The confocal microscope according to claim 6, wherein the predetermined determination reference and the predetermined combining method differ depending on a case of calculating the height information and a case of calculating the omnifocal brightness information.

9. The confocal microscope according to claim 6, wherein the predetermined determination reference is set based on a relationship between the signals respectively output from the plurality of photodetectors and a predetermined value, a difference between the signals respectively output from the plurality of photodetectors, or a relationship between an approximate curve obtained with the signals respectively output from the plurality of photodetectors and a reference curve.

10. A confocal microscope, comprising:
a plurality of objective lenses for converging light, which is emitted from a light source, to a sample;
a scanning unit for relatively scanning the sample with the light converged to the sample;
a focus moving unit for relatively moving a light-gathering position of the objective lens and a position of the sample along a direction of an optical axis of the converged light;
a plurality of confocal diaphragm apertures that are arranged at positions optically conjugate to the light-gathering position of the objective lens and have different diaphragm diameters;
a plurality of photodetectors for detecting intensities of lights respectively transmitting through the plurality of confocal diaphragm apertures;
a signal selecting unit for selecting at least one of signals output from the plurality of photodetectors in accordance with a type of the objective lens;
a weighting/combining arithmetic processing unit for combining a plurality of signals selected by the signal selecting unit after weighting the signals;
a brightness/height information calculating unit for calculating omnifocal brightness information and height information of the sample based on the signal resulting from an arithmetic operation of the weighting/combining arithmetic processing unit;
a weight ratio setting unit for setting at least two mutually different ratios; and a displaying unit for displaying a plurality of pieces of omnifocal brightness information calculated by the brightness/height information calculating unit on one screen;

wherein the weighting/combining arithmetic processing unit combines the plurality of signals after weighting the signals for each of the at least two ratios set by the weight ratio setting unit, and wherein the brightness/height information calculating unit calculates the omnifocal brightness information respectively for the plurality of signals resulting from the arithmetic operation of the weighting/combining arithmetic processing unit.

11. The confocal microscope according to claim 10, wherein:

the weighting/combining arithmetic processing unit determines a signal with higher reliability among a plurality of signals selected by the signal selecting unit; and the brightness/height information calculating unit calculates the omnifocal brightness information and the height information of the sample based on the signal with higher reliability, which is determined by the weighting/combining arithmetic processing unit.

12. The confocal microscope according to claim 10, wherein:

if only one signal output from a predetermined photodetector is selected by the signal selecting unit, a sensitivity or a gain of the predetermined photodetector is changed a plurality of times, and a signal is output from the predetermined photodetector to the weighting/combining arithmetic processing unit each time the sensitivity or the gain is changed; and the weighting/combining arithmetic processing unit determines a signal with higher reliability among a plurality of signals output from the predetermined photodetector, and the brightness/height information calculating unit calculates the omnifocal brightness information and the height information of the sample based on the signal with higher reliability, which is determined by the weighting/combining arithmetic processing unit.

13. The confocal microscope according to claim 11, wherein the weighting/combining arithmetic processing unit determines a signal, which is not saturated and an intensity of which is the highest, to be the signal with higher reliability among the plurality of signals output from the predetermined photodetector.

14. A confocal microscope comprising:

an objective lens for converging light, which is output from a light source, to a sample;

a scanning mechanism for relatively scanning the sample with the light converged to the sample;

a plurality of confocal diaphragm apertures that are arranged at positions optically conjugate to the light-gathering position of the objective lens and have different diaphragm diameters;

a plurality of photodetectors for detecting intensities of lights respectively transmitting through the plurality of confocal diaphragm apertures;

a weighting/combining arithmetic processing unit for combining signals respectively output from the plurality of photodetectors after weighting the signals;

a brightness/height information calculating unit for calculating omnifocal brightness information and height information of the sample based on a signal resulting from an arithmetic operation of the weighting/combining arithmetic processing unit;

a weight ratio setting unit for setting at least two mutually different ratios; and a displaying unit for displaying a plurality of pieces of omnifocal brightness information calculated by the brightness/height information calculating unit on one screen, wherein the weighting/combining arithmetic processing unit combines the plurality of signals after weighting the signals for each of the two or more ratios set by the weight ratio setting unit, and wherein the brightness/height information calculating unit calculates the omnifocal brightness information respectively for the plurality of signals resulting from an arithmetic operation of the weighting/combining arithmetic processing unit.

15. The confocal microscope according to claim 14, further comprising:

an arithmetic result selecting unit for causing a user to select one piece of omnifocal brightness information among the plurality of pieces of omnifocal brightness information displayed by the displaying unit; and a weight ratio instructing unit for instructing a ratio, which is used when the piece of omnifocal brightness information selected by the arithmetic result selecting unit is calculated, as a ratio used for the arithmetic operation of the weighting/combining arithmetic processing unit at and after next time.

16. A confocal microscope comprising:

an objective lens for converging light, which is output from a light source, to a sample;

a scanning mechanism for relatively scanning the sample with the light converged to the sample;

a plurality of confocal diaphragm apertures that are arranged at positions optically conjugate to the light-gathering position of the objective lens and have different diaphragm diameters;

a plurality of photodetectors for detecting intensities of lights respectively transmitting through the plurality of confocal diaphragm apertures;

a weight ratio adjustment unit for making adjustable a weight ratio which is applied when signals respectively output from the plurality of photodetectors are combined;

a weighting/combining arithmetic processing unit for combining signals respectively output from the plurality of photodetectors after weighting the signals based on a ratio of the weight ratio adjustment unit;

a brightness/height information calculating unit for calculating omnifocal brightness information and height information of the sample based on a signal resulting from an arithmetic operation of the weighting/combining arithmetic processing unit; and a displaying unit for displaying, on one screen, the weight ratio adjustment unit and the omnifocal brightness information calculated by the brightness/height information calculating unit.

17. The confocal microscope according to claim 14 or claim 16, wherein the weighting/combining arithmetic processing unit combines the signals respectively output from the plurality of photodetectors after weighting the signals by calculating a weighted mean of the signals.

18. The confocal microscope according to claim 17, wherein the displaying unit displays a result of an arithmetic operation performed by the weighting/combining arithmetic processing unit; and wherein the confocal microscope further comprises:

an instruction inputting unit for inputting a weight to the weighting/combining arithmetic processing unit, and for instructing the arithmetic operation and a display of the result of the arithmetic operation, wherein the weighting/combining arithmetic processing unit calculates a weighted mean based on the weight input by the instruction inputting unit, and causes the displaying unit to display the result of the arithmetic operation using the weighted mean.

19. The confocal microscope according to any one of claims 1, 6, 10, 14, and 16, wherein the plurality of photodetectors simultaneously detect the intensities of lights respectively transmitting through the plurality of confocal diaphragm apertures.

20. The confocal microscope according to any one of claims 1, 6, 10, 14, and 16, wherein the signals respectively output from the plurality of photodetectors are optically or electrically adjusted so that the intensities of the signals at a focused position of the sample become equal.

21. The confocal microscope according to any one of claims 1, 6, 10, 14, and 16, wherein the signals respectively output from the plurality of photodetectors are optically or electrically adjusted so that the intensities of the signals at a focused position of the sample become different at a predetermined ratio.

22. The confocal microscope according to any one of claims 1, 6, 10, 14, and 16, wherein the weighting/combining arithmetic processing unit executes a normalization process for the signals respectively output from the plurality of photodetectors based on sensitivity characteristics of the plurality of photodetectors.

* * * * *